United States Patent

Nobukawa et al.

[11] Patent Number: 4,696,513
[45] Date of Patent: Sep. 29, 1987

[54] CHUCKING DEVICE FOR MACHINE TOOLS

[76] Inventors: Akira Nobukawa, 676, Mukai-nagatani, Ekiya-cho, Fukuyama, Hiroshima-ken; Tatsue Sawaguchi, 390-2, Habu-cho, Fuchu-shi, Hiroshima-ken; Yoshihiro Kuroki, 69, Akaya, Kozan-cho, Sera-gun, Horishima-ken, all of Japan

[21] Appl. No.: 767,467
[22] Filed: Aug. 20, 1985
[51] Int. Cl.⁴ .............................................. B23B 31/12
[52] U.S. Cl. ...................................... 279/121; 279/123
[58] Field of Search ................................ 279/121, 123

[56] References Cited

U.S. PATENT DOCUMENTS 1,864,423  6/1932  Forkardt ............................. 279/121
3,198,533  8/1965  Goodrum ............................ 279/121
3,281,158 10/1966  Gibbons ............................. 279/121
4,410,192 10/1983  Nobukawa et al. ................ 279/121

FOREIGN PATENT DOCUMENTS 2214861  6/1973  Fed. Rep. of Germany ...... 279/121

Primary Examiner—Gil Weidenfeld
Assistant Examiner—Daniel W. Howell

[57] ABSTRACT

This invention relates to improvement of a chuck unit for machine tools consisting of main body, plunger, and master jaw. In a chuck where the master jaw and plunger engagement part constitutes an inverted T shape in cross section, slide surfaces of engagement between the wedge part of the master jaw and the plunger are formed into circular arc shape.

2 Claims, 12 Drawing Figures

CHUCKING DEVICE FOR MACHINE TOOLS

BACKGROUND OF THE INVENTION

As the number of revolutions of the main spindle of machine tools is made to increase, it will become necessary to increase the grabbing force (holding force) of chucks relative to the work. That is, due to the centrifugal force of the jaw of the chuck, part of grabbing force will be deleted by centrifugal force and finally cutting becomes an impossibility.

Such a holding device of conventional chucks is as shown in FIG. 1 to FIG. 4. That is, FIG. 1 represents a sectional profile of the upper part of the chuck device, in which radial slot grooves are provided on the body 1, divided in three equal parts in the radial direction, with master jaw 2, as shown in FIG. 2 slidably fitted. And at the front of the master jaw 2, top jaw 3 is secured with a bolt, and at the same time, in the inner diameter of body 1, plunger 4 is fitted slidably in the axial direction. Also, at the outer periphery of plunger 4, inverted T-shaped wedge groove 5 as shown in FIG. 3 is provided, splitting the periphery into three equal part directions (only one direction is shown), engaging wedge part 2a provided in the master jaw 2, which arrangement is shown in detail in the sectional cross section on X—X' line in FIG. 1.

On wedge part 2a of jaw 2, the force of arrow head marked P is applied as jaw 4 slides, but, since movement is possible also in the direction orthogonal to such force P, that is, in the XY direction, if effects of the holding surface (irregularity, etc.) of work are given during holding, then movement will be made from time to time in the XY direction by deformation of the neck portion of the wedge part 2a and besides, on the jaw area 5b (explanation given only for one side; the opposite side will be similar and explanation will be omitted hereunder) of the inverted T-shaped wedge groove provided on plunger 4, bending moment M is applied in the direction marked by the arrow head with part Q where contact between the inner periphery of body 1 makes or breaks servicing as base point; moreover as such applied force P is increased, mainly on part H from the upper corner part within the groove to the plunger outer periphery stress concentration will occur resulting in zigzag shaped damages.

In order to prevent the above-mentioned damages, it will serve the purpose if especially the above-mentioned part, that is, width H part shown in the figure is designed to be comparatively larger. But, this makes the cubic capacity of plunger 4 increase which will be opposite to the principle of compactness and also it will be a problem by increasing costs.

The present applicant has previously proposed U.S. Pat. No. 4,410,192 in order to solve these problems. Special features of the proposition were that, in a chuck having a chuck body, a plunger to slide in the axial direction of the body, and a master jaw linked to such axial direction movement and sliding in its radial direction, the master jaw is freely slidable, guided by the guide groove provided on the body. At the same time, the wedge like T-shaped projection is provided on the master jaw, such T-shaped projection being made to fit in the T-shaped wedge groove provided on the plunger, and moreover, it is so designed that when the plunger is made to move in the axial direction, the OPEN/CLOSE of the master jaw will be actuated by wedge action; besides master jaw guide groove width E on the body is constructed such that it will have the relationship of E<G relative to wedge width G of the T-shaped projection of the master jaw.

OBJECT OF THE INVENTION

The present invention makes further improvement of such conventional techniques and makes it possible to obtain positive and strong holding force. That is, the present invention consists of main body, plunger, and master jaw. In a chuck where master jaw and plunger engagement part forms an inverted T-shape, previously mentioned conventional shortcomings will be eliminated by forming slide surfaces at the engagement part of the master jaw wedge part and the plunger into a circular arc shape. According to the present invention, the force of the plunger moving in the axial direction will be converted to radial direction with good efficiency and powerful strength and transmitted; also, as a separate advantage, since movement in the circumferential direction is possible, a pendulum movement will be possible making grabbing of irregular shaped object trouble free and high in accuracy.

BRIEF DESCRIPTION OF DRAWINGS

FIG. 2 a view of master jaw, FIG. 3 a view showing plunger wedge groove, and FIG. 4 a sectional cross section of X—X'line of FIG. 1.

DESCRIPTION OF THE PREFERRED EMBODIMENTS

Figure 5:
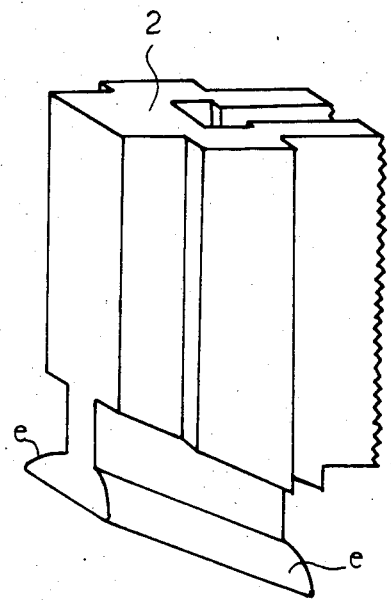
FIG. 5 is a view of the master jaw improved related to the present invention.
Figure 6:
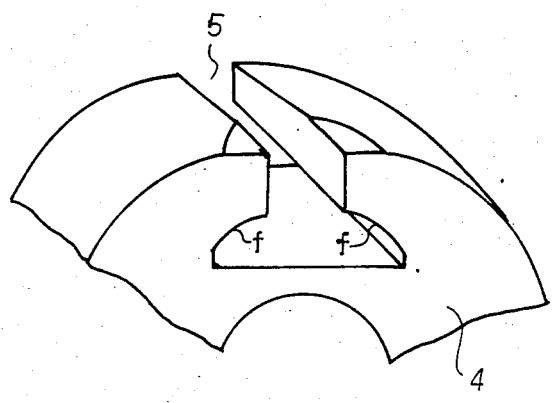
FIG. 6 also represents a sectional view of the plunger.
Figure 7:
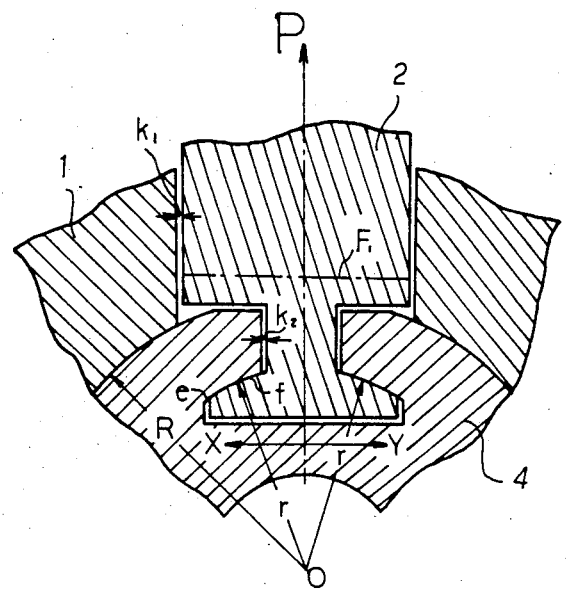
FIG. 7 represents a sectional cross section of the combination of both.

FIG. 5 is a view of the master jaw, improved related to the present invention. FIG. 6 also represents a sectional view of plunger. FIG. 7 represents sectional cross section of the combination of both.

In the illustrated figures, as seen in the above-mentioned figures, the center of curvature is made concentric such that curvatures of wedge part 2a of the master jaw and the peripheral surface of plunger 4, that is, e and f, will be equal. (Refer to FIG. 7) In relation to the same, it is desirable that the above curvatures will be formed such that they will be equal to the bending stress distribution curve during grabbing action in operation; also, in the construction where outer peripheral radius R of plunger 4 and radius of curvature r of the slide surfaces of both at the above-mentioned engagement are formed concentric, master jaw 2 will not move in a direction orthogonal to force P applied to grab work, that is in the XY direction, regardless of the state of clearance $K_1$ and $K_2$. As plunger 4 can make fine differential movement sliding surface engagement during grabbing of work relative to its circumferential direction, powerful grabbing with no unreasonable force applied to the engagement surface; and even when fine differential movement is made, grabbing accuracy (off center) will not be affected due to concentricity. In contrast, in conventional devices, plunger 4 will be unable to make fine differential movement relative to its circumferential direction, the above-mentioned effects of action will not be achieved, and besides, local stress concentration will constitute the cause of damage.

Figure 8:
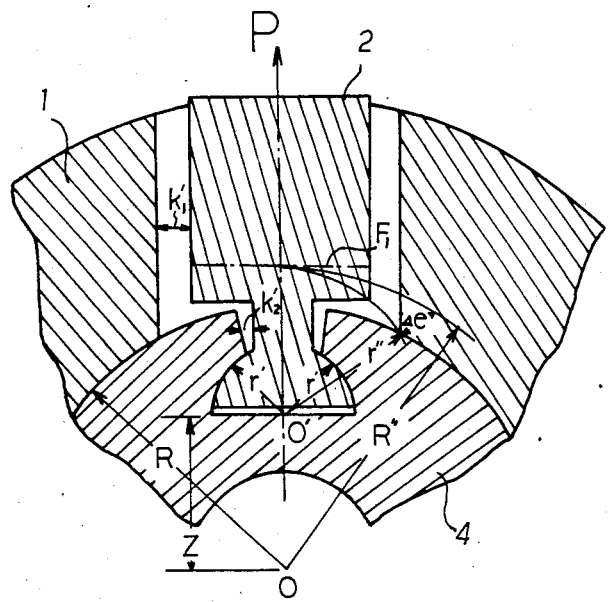
FIGS. 8~12 represent other examples, being sectional cross section of the combination of master jaw and plunger.

FIG. 8 shows an other example and represents a sectional cross section under the state of combination of master jaw 2 and plunger 4. In the above-mentioned example, wedge part 2a of master jaw 2 and plunger 4 are made identical in circular arc shapes, and moreover, their centers of curvature are made concentric. In this example, they are made different from each other.

In the illustrated example, relationship of radius of curvature between both is $r^1 < R^1$ and moreover, center of curvature $0'$ of the former is provided at a position about distance Z away from that of the latter 0, and higher up. In this figure, $K'_1$ represents the gap formed between the groove provided at the side of main body, 1; $K'_2$ represents the gap formed between the groove provided on plunger 4. The larger the gaps $K'_1$ and $K'_2$ are, the larger will be the rocking range of master jaw 2, making it possible to grab work powerfully. The above means movement of plunger 4 in the circumferential direction is made relatively possible, permitting the same effects of action possible.

Figure 1:
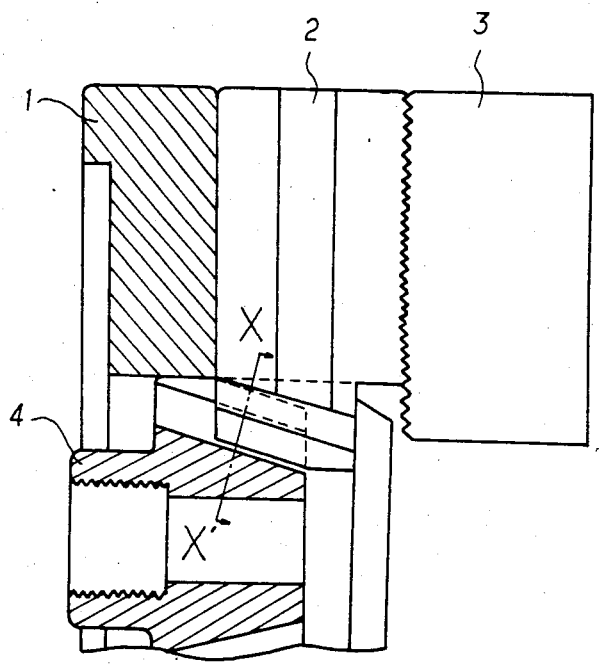
FIGS. 1~4 represent conventional devices, FIG. 1 being a sectional cross section of upper part of chuck device.
Figure 2:
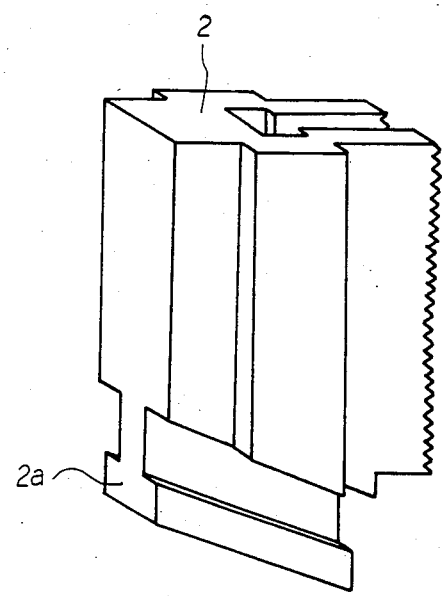
Figure 3:
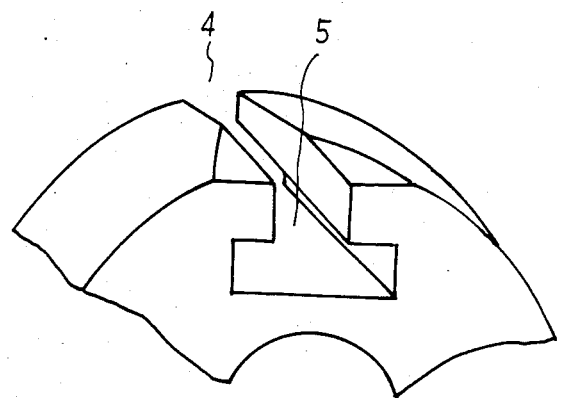
Figure 4:
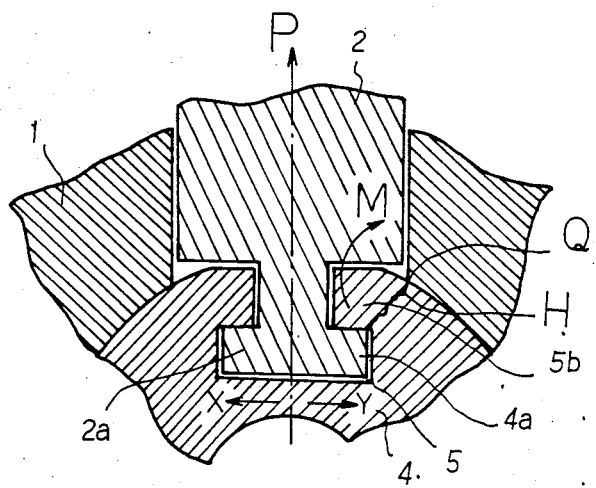

Holding relative to work is in fact by means of top jaw 3 installed to the front part of master jaw 2 in FIG. 1. But, in this figure, the location corresponding to such grabbing surface is shown by imaginary line $F_1$, and at the same time, under gaps $K'_1$ and $K'_2$ as shown illustrated, differential $\Delta e$ of radiuses linking the centers of curvature 0 and $0'$ and the imaginary line $F^1$, $R''$ and $r''$ will be accommodated to irregular differentials of work (in and out differential of irregularities on outer periphery) without trouble while being made possible to develop powerful grab (outer diameter holding). In such a case, where $R'$ and $r'$ are made constant, there will be a possibility of accommodating to irregular differentials with Z increased.

Figure 9:
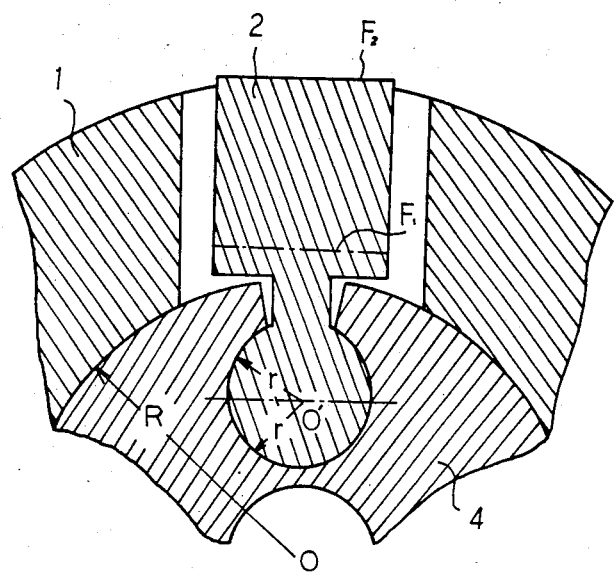

FIG. 9 represents another example. The above-mentioned embodiment represents simply a configuration to grab the outer peripheral diameter side. The present configuration represents making it possible to grab, from both sides, the inner peripheral diameter. That is, grabbing surface $F_2$ in this case will be the top part of master jaw 2 (actually, the above-mentioned corresponding point of top jaw 3 installed at the front of master jaw 2) and the point where the bending moment during grabbing is applied will be, contrary to the preceding example, the lower part, and hence such part is formed in a circular arc form, that is, in general, both engagement parts (slide surfaces) are formed into a single spheroidal shape.

Figure 10:
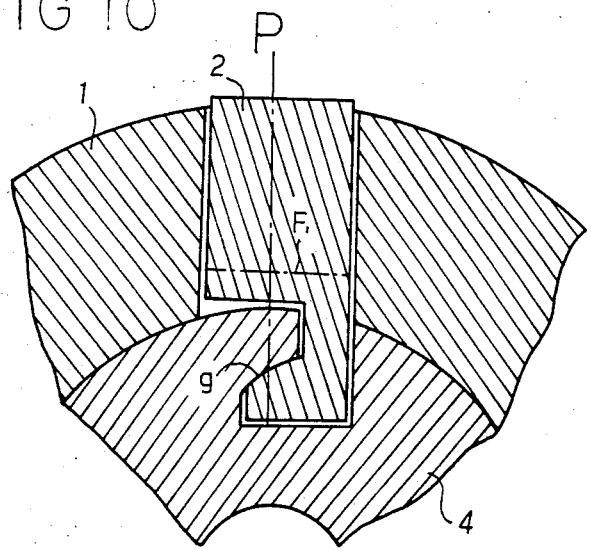
Figure 11:
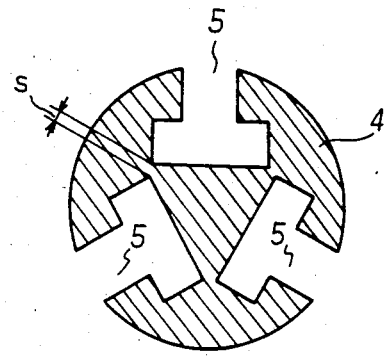

FIG. 10 represents still another example. In this example, a shortcoming of a small sized chuck is shown, that is, in the ordinary chuck using three pawls, in making the device compact, wedge groove 5 provided to master jaw 4 in the conventional system will be gradually narrowed by squeezing adjacent groove distance S, hence, breakage accidents will occur frequently. In the present example, the above-mentioned problem is removed through making the construction of the wedge part of master jaw 2 to take a boot shape as shown in FIG. 10, and, at the same time, construction is designed such that relative to force P applied for the sake of grabbing, the relationship of $l = m$ has been deflected a little. The example shows the embodiment for the purpose of grabbing the outer peripheral diameter of the work and $F_1$ constitutes an imaginary grabbing line. Here, the slide surface to which the bending moment is applied will be formed into a circular arc shape g, the same as for the previous example.

Figure 12:
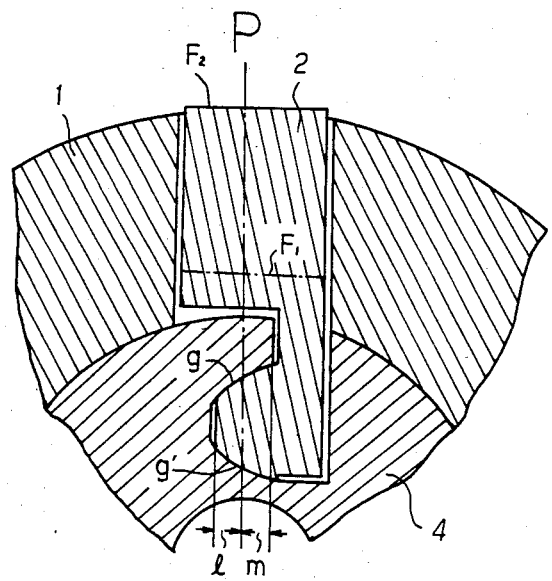

In FIG. 12, the embodiment has the possibility of grabbing both sides of the inner peripheral diameter. The lower part opposite to the above-mentioned circular arc g is formed into a similar symmetrical circular arc $g'$. $F_2$ represents an imaginary line to indicate grabbing surface.

The present invention gives construction of the above description, and as it is possible to move the jaw in the direction along the circumference of the plunger, each pawl shares respectively a uniform grabbing force in carrying out chucking, thus making it possible to design a substantial improvement in grabbing force.

On the other hand, at the engagement part (slide surfaces) of master jaw and plunger, the force to grab work is received by a surface always having a certain expanse, unlike conventional contact made by a simple point or a line, making the grabbing force stabilized and enabling positive and powerful grabbing. Also, such phenomenon as seizure will not occur.

On the other hand, the groove of plunger and the groove of the main body side where the master jaw is engaged and slide, indexing accuracy obtained by equal splitting in providing the grooves will be superior to conventional 20', and 30' units, and such split accuracy will be as good as an order of 1°, saving facilities investment costs and machining time, moreover, making assembly easier. Also, running costs will be reduced.

We claim:
1. A chuck device in a machine tool comprising:
   (a) a body,
   (b) a plunger and jaws engaged with said plunger, the engagement part of the respective jaws with said plunger being wedge-shaped,
   (c) a sliding surface on the engagement part of the wedge part of jaws which, with the plunger, forms a circular arc, and
   (d) slot grooves in said body;
   (e) said jaws engaged with and inserted in said slot grooves;
   (f) large, horizontal clearance being provided between said slot grooves and said jaws, whereby said jaws freely swing like a pendulum.
2. The device of claim 1 wherein said circular arc shape of said wedge part of said jaw and plunger are identical and their centers of curvatures are concentric.

* * * * *

UNITED STATES PATENT AND TRADEMARK OFFICE
CERTIFICATE OF CORRECTION

PATENT NO. : 4,696,513
DATED : September 29, 1987
INVENTOR(S) : Akira Nobukawa et al.

It is certified that error appears in the above-identified patent and that said Letters Patent are hereby corrected as shown below:

ON THE TITLE PAGE INSERT:

-- (73) Assignee: Kitagawa Iron Works Co., Ltd.
Hiroshima-ken, Japan --.

Signed and Sealed this

Second Day of February, 1988

Attest:

DONALD J. QUIGG

Attesting Officer

Commissioner of Patents and Trademarks